Nov. 3, 1959 H. FISCHER 2,911,567
ULTRA SHORT LIGHT PULSE GENERATION
Filed March 28, 1958 4 Sheets-Sheet 1

INVENTOR.
HEINZ FISCHER
BY
ATTORNEYS

Nov. 3, 1959
H. FISCHER
2,911,567
ULTRA SHORT LIGHT PULSE GENERATION
Filed March 28, 1958
4 Sheets-Sheet 3
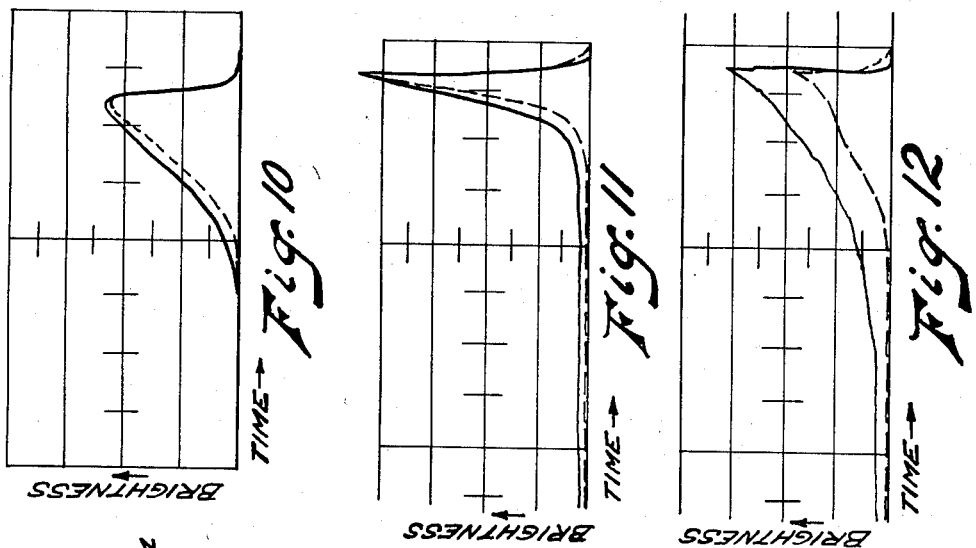
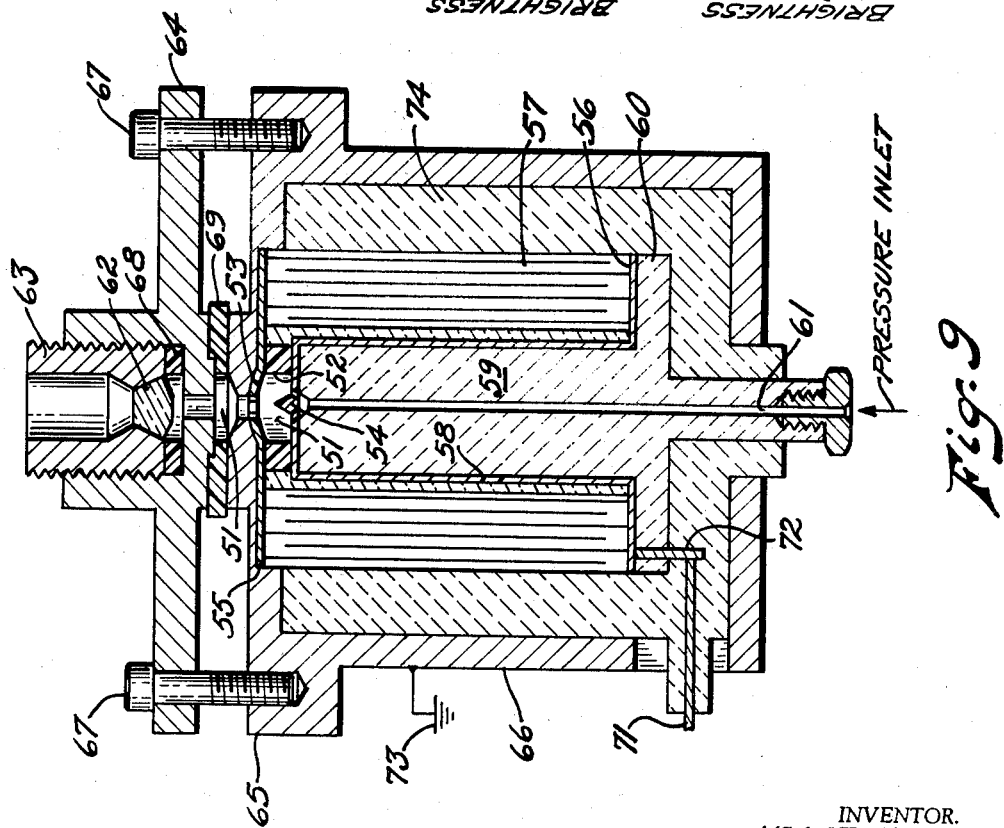
INVENTOR.
HEINZ FISCHER

United States Patent Office 2,911,567
Patented Nov. 3, 1959

2,911,567

ULTRA SHORT LIGHT PULSE GENERATION

Heinz Fischer, Belmont, Mass.

Application March 28, 1958, Serial No. 724,776

2 Claims. (Cl. 315—61)

(Granted under Title 35, U.S. Code (1952), sec. 266)

The invention described herein may be manufactured and used by or for the United States Government for governmental purposes without payment to me of any royalty thereon.

This invention relates to light generation, and particularly to the generation of light pulses of extraordinary brilliance and having a duration limited to a small fraction of a microsecond.

In my Patent No. 2,728,877, granted December 27, 1955, there is described a method and apparatus for generating heat pulses of high intensity, suitable for many purposes including, as examples, infra-red signalling, nuclear reaction triggering, material melting, and metal vaporization. As summarized in the specification of the patent, the method comprises building up a direct current charge on a capacitor assembly of toroidal contour, and discharging the capacitor across a pressurized gas gap at the axis of the toroid, the gap being in the center of a chamber whose walls are opaque except for a small insert of lithium fluoride or some equivalently good conductor of optical radiation. The capacitor and associated circuitry are such as to minimize inductance and resistance effects and thus reduce the discharging time by eliminating practically all current flow delaying factors.

While the objective discussed at greatest length in the aforesaid patent is the rapid production of an extremely high temperature, the fact is that the production of intensely brilliant light pulses of ultra-short duration is also inherent in the operation, and references to this fact are set out in the patent specification. The present invention involves the provision of three additional methods of producing ultra-short light pulses of extreme brilliance, which methods may be distinguished, each from the others by these designations, namely:

(1) The open air gap method;
(2) The low-pressure method; and
(3) The high-pressure method.

The present invention further involves the provision of apparatus capable of putting into practice the concepts of light-pulse generation falling into the three categories indicated.

Figure 6:
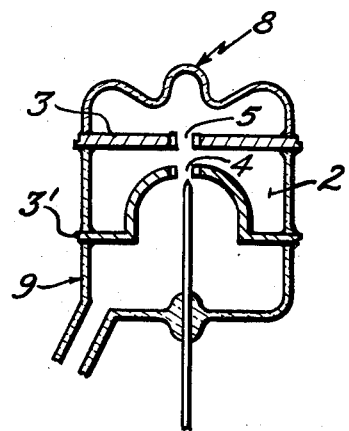
Figure 7:
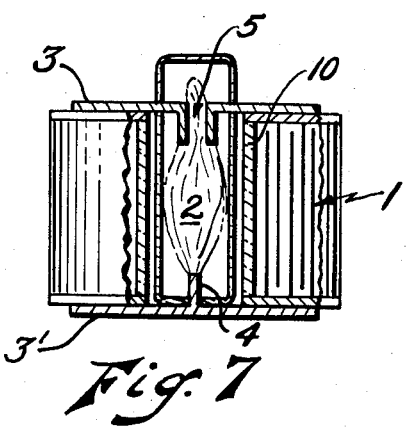
Figure 8:
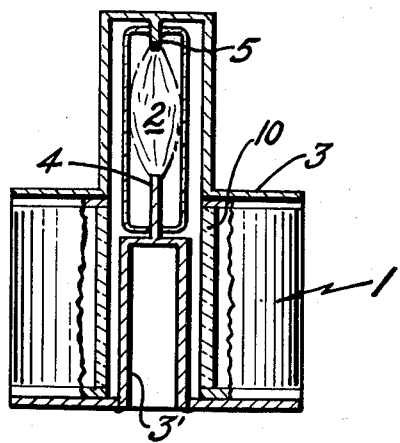

Other objects and characteristics of the invention will become apparent upon reference to the following description of the invention and the accompanying drawings wherein:

Figs. 1 to 5, and Fig. 13, are views, partly sectional and partly schematic, illustrating structures for putting into practice the "open air gap" concept above referred to;

Figs. 6, 7, and 8 are views illustrating structures for putting into practice the "low-pressure" concept above referred to;

Fig. 9 is a longitudinal sectional view of a structure for putting into practice the "high-pressure" concept above referred to; and Figs. 10, 11, and 12 are pulse time diagrams hereinafter explained.

By way of introduction to the following description it may be noted that commercial "flash-lamps" utilizing capacitor circuitry obtain light pulses of approximately 1 microsecond or longer. Their peak brightness in absolute values of brightness, i.e., candles per cm.$^2$, are normally not reported, but have been measured by applicant recently and found to be in the order of approximately 5 million candles/cm.$^2$.

Experimental studies have proved that it is the length of the electrical pulse of such flash lamp which in the first approximation determines the length of the light pulse, and it was observed by applicant that the brightness maximum correlates closely in time with the current maximum even in case of capacitor discharges as short as 5–10$^{-8}$ seconds. It also was found that the amplitude of the light pulse (brightness) is determined to a large extent by the discharge current.

In case of a capacitor discharge in which the resistance in the spark gap is not kept up by a "squeeze" of the spark channel, the resistance of the gap during the time of the discharge becomes extremely small, which results in an oscillating discharge. Here the maximum current in first approximation is expressed by the following equation:

(1) $\qquad i_{max} \sim U(C/L)^{1/2}$ [amps.]

the pulse length on the other hand is (2) $\qquad \tau 2 \sim (LC)^{1/2}$ [sec.]

So, it is obvious from (1) and (2) that at a given breakdown voltage U the ratio C/L must be made as large as possible in order to get a current $i_{max}$ as large as possible (i.e., maximum brightness) at a minimum pulse length $\tau$.

The ideal case, in respect to current pulse shape and energy transfer from the capacitor into the gap, is met when the inductance L can be decreased to a value (3) $\qquad L=4R^2C$ [henries]

because here the discharge is critically damped and the energy transfer into the channel being maximum, which is ½ of the total capacitor energy.

(4) $\qquad K=CU^2/2$ [joules]

So far, the critically damped case could not be materialized in a high current capacitor discharge without "squeezing" the channel through a tube or aperture. Actually, the spark resistance $R_s$ (decreasing with the current) may become of the order of less than 10$^{-3}$ ohms representing only a small fraction of the total resistance R. In this case, most of the energy is used up in the outer circuit. Consequently, reduction of the resistance $R_c$ of the outer circuit to a minimum is of importance.

The oscillating spark current leads to humps and a tail in the decaying part of the light pulse and in most applications it is required that this tail is kept to a minimum, respectively have been cut off; this latter is accomplished to some extent by an additional quenching gap.

The spark resistance can be kept up to some extent by forcing the discharge through a narrow capillary or other aperture, which stops the channel's expansion. The problem is to "squeeze" the channel just right so that the circuit is critically damped, which is when (3a) $$R_s = 2(L/C)^{1/2}$$

The proper diameter to enforce this condition depends upon discharge parameters such as gas pressure, current, etc., and is a delicate problem to determine. The expansion forces, on the other hand, especially at large gas pressure may become so large that a practical solution of the squeeze problem becomes difficult.

Figure 1:
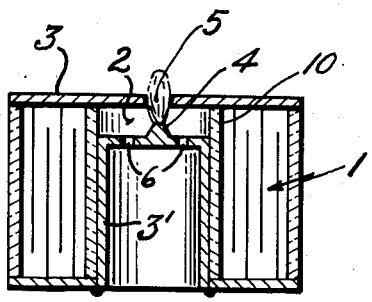

Fig. 1 represents the diagram of a simple air lamp. It consists of a coaxial capacitor 1 which surrounds the discharge 2, as indicated. Thus, the capacitor, the air gap and the electric connections 3 to the gap form together a symmetrical coaxial line reducing the inductance L of the complete circuit to a minimum. The discharge takes place between the pointed electrode 4 and the center hole 5 in the top plate, producing a bright spark channel between the electrodes which may extend into a radiating "bubble" as indicated in Fig. 1. The size and brightness of this bubble depends largely upon parameters such as of the nature of gas, pressure, capacity C, breakdown voltage U, hole diameter $d$, as well as thickness of the top plate. The bubble extends out of the hole as much as ½ cm. and more. Change in polarity of the electrodes 4, 5 does not seem to greatly influence the visual appearance of the bubble, however, the amplitude (brightness) of individual shots was found to be more reproducible in case of a negative top plate (cathode). The inside connection to the pointed electrode provides several exhaust holes 6, as indicated.

Figure 2:
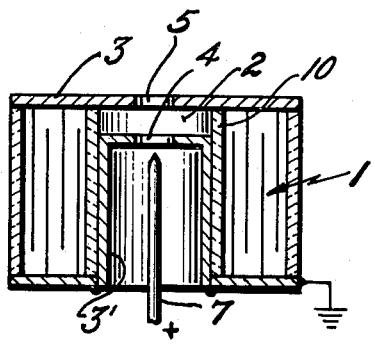

A triggered coaxial air gap is shown in Fig. 2. It applies the same general geometry, however, provides a trigger 7. The pointed electrode in Fig. 1 is now replaced in Fig. 2 by an electrode having a hole 4 through which the discharge between electrodes 4 and 5 may be triggered. This hole in electrode 4 is important since it permits short wave radiation from the trigger discharge to enter into the prospective path of the main discharge in chamber 2 which is to be triggered. This radiation from the trigger discharge has been found to cut down formative time lags (jitter) in the firing of the main discharge. The trigger pulse at electrode 7 may be positive or negative.

The end-on geometry, as applied in Figs. 1 and 2, provides basically a point light source, the radiation of which originates from the "bubble" formed in the hole of the top electrode. Added to this radiation is the radiation from the spark channel which is seen end-on through the center hole in case of a transparent bubble. Results obtained with the open air gap method, as recorded below in Table 1, indicate that the bubble apparently contributes largely to the radiation. The radiation pulse trails off with the current, which generally oscillates in the case of an unrestricted spark channel, as above pointed out.

When spectrally resolved, the radiation pulse showed strong differences in its decay time. It was found that certain spectral lines decay much slower than the rest of the visible and UV spectrum. This phenomenon is further discussed hereinafter.

*Quantitative results.*—The subjoined "Table 1" gives figures on brightness B and pulse lengths ($\Delta t_1$=half width; $\Delta t_2$=base width) as actually obtained with several test lamps of the type shown in Fig. 1.

TABLE 1

*Brightness B and pulse length $\Delta t$*

[Fig. 1 type of lamp]

| No. | Cap, cm. | Hole, cm. | U, Kv. | C, $\mu$F. | L, $\mu$H. | $\tau$, $\mu$sec. | C/L | $i_{max}$, K. amp. | B, $10^6$ cand./cm.$^2$ | $\Delta t_1$, $\mu$sec. | $\Delta t_2$, $\mu$sec. | R, ohms ×10$^{-3}$ | K, joules |
|---|---|---|---|---|---|---|---|---|---|---|---|---|---|
| 1 | .07 | 0.1 | 3.17 | 0.1 | 0.004 | 0.127 | 25 | 15.7 | 20.2 | | | 36 | 0.5 |
| 2 | .08 | 0.1 | 3.33 | 0.1 | 0.004 | 0.127 | 25 | 16.6 | 18.7 | 0.2 | 0.37 | 43 | 0.55 |
| 3 | .08 | | 3.5 | 0.1 | 0.004 | 0.125 | 25 | 17.5 | 23.2 | 0.25 | 0.6 | 35 | 0.55 |
| 4 | .08 | 0.1 | 3.33 | 0.05 | 0.004 | 0.091 | 12.5 | 11.8 | 11.9 | ~0.22 | 0.54 | 40 | 0.275 |
| 5 | .07 | 0.1 | 3.17 | 0.025 | 0.004 | 0.063 | 6.25 | 7.9 | 5.5 | ~0.01 | 0.38 | 50 | 0.124 |
| 6 | .07 | | 3.1 | 2.8 | 0.035 | ~1.95 | 80 | 27.8 | 42 | | | | 13.4 |

*Inductances.*—The toroidal capacitors used in the tested lamps were of the extended foil type indicated in Fig. 1. These values of L, however, do not represent optimum values for this type of capacitor. In case of test specimens Nos. 4, 5 in Table 1, the capacitors were over-dimensioned; actual L values can be made smaller, at least by a factor 2 to 4, without any change in material or design.

Substantial reduction of L under that of the extended foil-type can be achieved by substituting a long ribbon type coaxial capacitor. In such an arrangement the capacitor foils need not be cross-conected at top and bottom; one end may be left open and the other end fed directly into a coaxial line, which is connected to the spark gap in the manner indicated in Figs. 1 and 2. Inductances of $L < 10^{-9}$ henries may be safely expected from this type of capacitor.

*Brightness.*—The B values already obtained with the coaxial open air gap are considerably larger than those of the customary commercial flash lamps as demonstrated in Table 1. With the tested lamps, the brightness goes roughly with the current $i_{max}$, as was discussed in the introduction, providing that L and C/L factor determine B to a large extent. The significance of extremely good contact is demonstrated in the data of lamp No. 2 in Table 1, where B is reduced due to increased resistance $R_c$ in the outer circuit, in spite of C and L being equal to No. 1; the pulse width on the other hand is reduced substantially by the increased damping.

On the basis of these results, approximate B values for the invented light source may be predicted from known electric data, U, C, L, which may be calculated. The calculation of L, however, becomes difficult when considering extreme small values $L < 10^{-9}$ henries and consequently short electric pulses. Here the spark gap itself may represent a considerable part of the total inductance.

With increasing spark current, the brightness approaches a limiting value which in the open air gap was found to be between 40–50 million candles/cm.$^2$ (see also lamp 6 in Table 1). When this value is reached, the radiation pulse (brightness as a function of time) becomes wider. This widening shows up much more pronounced in the total flux (candles) time function. It may even lead to a considerable increase of the flux amplitude after the current has reached its maximum.

*Pulse length.*—Applying geometry of Fig. 1, the experimental length of the radiation pulse, according to Table 1, is roughly $\Delta t_1 \sim 2\tau$ for the half width and approximately $\Delta t_2 \sim 6\tau$ for the base width including the tail which results from the current oscillations—$\Delta t_2$ is difficult to analyze since the "bubble" and spark channel may have different decay times. In case of a transparent bubble, the tail of the radiation time function as emitted through the hole may even be cut off to a large extent by its aperture, as is discussed in a later paragraph. Since the opacity of the bubble is expected to decrease with the spark current, this may mean that pulse widths $\Delta t_2 < 6\tau$ may be expected in case of extremely small $\tau < 0.1$ microsecond because $C/L$ (see introduction) and consequently $i_{max}$ will have to be sacrificed in order to obtain extremely small values of $\tau$.

Figure 5:
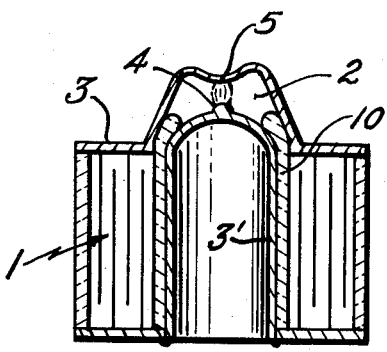

*Predicted values.*—Based on the discussion of the preceding paragraph, the following values of B and pulse length $\Delta t$ are considered possible:

*Open cage.*—The coaxial pulse light source discussed so far is not restricted to end-on observation (see Figs. 1 and 2). The open air gap may be extended out of the coaxial capacitor by means of an open cage allowing complete axial side view of the channel, as illustrated in Fig. 5. Such a lateral display of the lift pulses may be advantageous for certain purposes.

*Sealed coaxial low-pressure lamp.*—

(1) The geometry which was discussed in the preceding paragraphs for the open air gap may be applied for the sealed low-pressure lamp. Fig. 6 shows the design of such a lamp as built and tested successfully to a moderate extent. This lamp does not suggest maximum pulse power because of the danger of window blackening. Definitive advantage however lies at small pressure in the lower breakdown voltages, longer spark channel, easier squeeze and higher repetition rates. The lamp may apply any inert gases.

TABLE 2

*Predicted values of B and $\Delta t$*

| Capacitor | U, Kv. | C, µF. | K, joules | L, µH. | C/L | $\tau$, µsec. | $i_{max}$, K. amp. | $R_{ap}$, ohm | B, $10^6$ candles/cm.² | $\Delta t_1$, µsec. | $\Delta t_2$, µsec. |
|---|---|---|---|---|---|---|---|---|---|---|---|
| Extended foil | 4 | 0.2 | 1.6 | .004 | 50.0 | .178 | 28.2 | .283 | ~40 | .356 | 1.068 |
|  | 4 | 0.05 | .4 | .002 | 25.0 | .063 | 20.0 | .40 | ~25 | .12 | .376 |
|  | 4 | 0.02 | .16 | .001 | 10.0 | .028 | 12.6 | .634 | ~18 | .056 | .168 |
| Long ribbon | 4 | 0.2 | 1.6 | .001 | 200.0 | .089 | 56.5 | .141 | ~40-50 | .18 | .534 |
|  | 4 | .05 | .4 | .0005 | 100.0 | .031 | 40 | .20 | ~40 | .06 | .186 |
|  | 4 | .02 | .16 | .0005 | 40.0 | .020 | 25.4 | .316 | ~30 | .04 | .120 |

These values of Table 2 are to be considered rough estimations. Of special interest appears the application of the long ribbon type capacitor, since it possibly allows a critical damped discharge (see low values of $R_{ap}$ in Table 2).

The amplitude (brightness) of individual shots as observed from end-on (see Figs. 1 and 2) is connected with statistic changes largely due to the fact that the discharge does not fire each time from the same spot of the pointed electrode into the same spot of the hole. Improvement in the reproducibility is obtained by radio-active material used in electrode tips 4, 7, and walls of the hole electrode.

Figure 3:
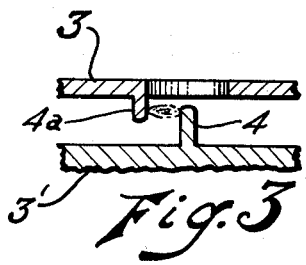
Figure 3A:
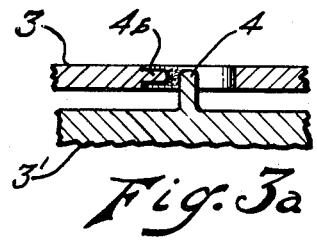

Most successful in accomplishing reproducible amplitudes of single shots has proven an arrangement as sketched in Fig. 3, however, leads to a slightly wider light pulse (see Table 1). Here the discharge fires from electrode 4 to another tip which is extended into the gap from the top plate, as indicated in Fig. 3. The hole is set off center. Seen through the hole, the channel now lies across. The discharge does not fire any more axially into the hole, eliminating the bubble to a large extent. This means the channel is seen perpendicularly across which accounts for the longer radiation pulse, as illustrated in the graph, Fig. 10; L and $\tau$ are practically unchanged due to the unchanged overall geometry. Fig. 3a shows a variation of the same concept.

The trace depicted in Fig. 10 consists of 10 shots, demonstrating that the amplitudes are constant within approximately ±5%. The Fig. 10 time base is 0.2 µsec/div.

Figure 4:
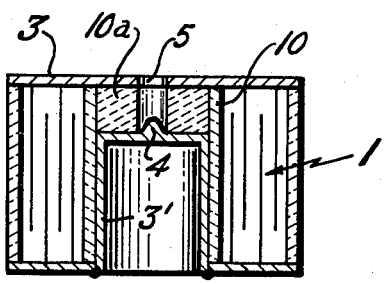
Figure 13:
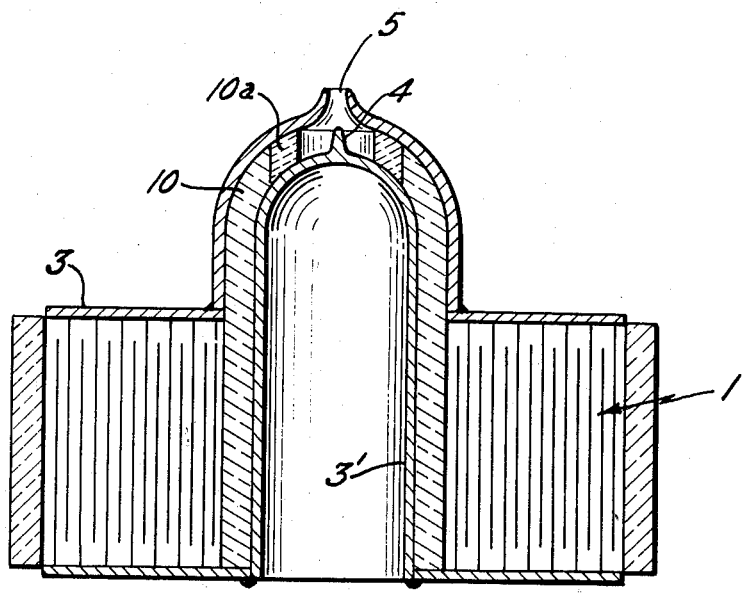

Squeeze of the channel by means of an inserted capillary 10a made of insulating material such as quartz, fired lava, etc., is shown in Fig. 4. Fig. 13 shows another form of "squeezed" channel.

This arrangement not only allows increase in the spark resistance, $R_s$ preferably to the critical value, see Formula 3a, but also keeps the channel lined up in the axis of the center hole leading to a constant amplitude of individual shots.

The container 9 in Fig. 6 consists of glass, quartz glass or other insulating material. The electrodes 2 are made of cover with inserted tungsten pieces 3 for the electrodes. The "bubble" window 8 due to its extremely small thickness had adequate U.V. and infrared transmission, allowing the lamp to be used for visual as well as for U.V. and infrared source. Undesired radiation may be filtered out by spectral filters.

The pressure in the tube can be chosen anywhere around one atmosphere or under, depending upon the application in this specific case and the nature of gas. Generally, a gas pressure in the range from 100-400 mm. Hg may be considered practical.

(2) Simple sealed lamps with a squeezed channel are illustrated in Figs. 7 and 8.

*Demountable high-pressure lamp.*—

(1) Different designs of coaxial high pressure lamps have been built and successfully tested. They follow the geometry of the lamps described above. They include the end-on type as well as the open cage sideview type (see Figs. 1, 2, 6).

(2) Maximum brightness. It has been found by applicant that for a given capacitor and gap length, the visual brightness B increases strongly with the gas pressure p to an ultimate upper limit $R_{max}$ which is determined mainly by the nature of the gas; $B_{max}$ can be increased to some extent by improved efficiency factor $C/L$. Opacity measurements showed that this ultimate brightness is obtained shortly after the spark channel reaches opacity. So far, the largest values $B_{max}$ were obtained in helium, amounting to approximately 150 million candles/cm.². Apparently this is due to the fact that helium reaches opacity at considerably larger values of p and current than other gases. Helium, on the other hand, due to its larger transparency at lower pulse energy, is by no means the most efficient radiator. Argon, for example, has much larger brightness at relatively small energies. Table 3 gives comparison values of brightness for different gases in different type of apparatus.

TABLE 3

*Comparison of values of brightness obtained in different apparatus*

| No. | Gap, cm. | Gas | $P_t$, lbs. | $U$, Kv. | $C$, μF. | $L$, μH. | $\tau$, μsec. | $C/L$ | $i_{max}$, K. amp. | $B$, Million Cand./cm.² | $R$, Milliohms | $K$, joules |
|---|---|---|---|---|---|---|---|---|---|---|---|---|
| 1 | 0.2 | Ar | 25 | 4.5 | 0.57 | .15 | 1.95 | 3.8 | 8.8 | 11.5 | 12.0 | 5.8 |
| 2 | 0.2 | Ar | 100 | 8.5 | 0.57 | .15 | 1.95 | 3.8 | 16.6 | ²23.0 | 7.0 | 20.5 |
| 3 | 0.2 | He | 200 | 4.75 | 0.57 | .15 | 1.95 | 3.8 | 9.3 | 6.0 | 12.0 | 6.4 |
| 4 | 0.2 | He | 1,500 | 16.0 | 0.57 | .15 | 1.95 | 3.8 | 31.2 | ²60.0 | 4.0 | 73.1 |
| 5 | 0.2 | Ar | 20 | 3.15 | 2.75 | .033 | 1.95 | 82.5 | 28.6 | 72.5 | <2 | 13.0 |
| 6 | 0.2 | Ar | 40 | 4.0 | 2.75 | .033 | 1.95 | 82.5 | 36.2 | ²98 | <2 | 20.8 |
| 7 | 0.2 | He | 100 | 2.66 | 2.75 | .033 | 1.95 | 82.5 | 24.2 | 3.9 | <2 | 9.7 |
| 8 | 0.2 | He | 200 | 4.15 | 2.75 | .033 | 1.95 | 82.5 | 37.7 | 8.1 | <2 | 23.6 |
| 9 | 0.2 | He | 400 | 6.8 | 2.75 | .033 | 1.95 | 82.5 | 61.8 | ²170 | <2 | 63.5 |
| 10 ¹ | 0.2 | Ar | 50 | 2.5 | 5.5 | .016 | 1.90 | 350 | 46.7 | 23 | | 17.2 |
| 11 ¹ | 0.2 | He | 100 | 2.5 | 5.5 | .016 | 1.90 | 350 | 46.7 | 45 | | 17.2 |

¹ 10, 11 and on through hole, all others side view.
² Ultimate brightness.

If this explanation is true, there is promise that higher ultimate values $B_{max}$ may be obtained in hydrogen which is more transparent than helium.

(3) *Medium energy.* A compact and easily demountable test lamp for pressures between approximately 1–20 atmospheres and breakdown voltages under approximately 10 kv. is shown in Fig. 9. This lamp, which has been extensively and successfully tested in the gases $H_2$, He and argon, is mounted in a container which encloses both the capacitor and the gap; however, only the spark chamber is pressurized.

The spark chamber 51 is bounded peripherally by a sealing gland 52 of "Teflon" or the like, and is bounded laterally by electrodes 53 and 54, the former being the centrally perforated portion of capacitor terminal plate 55, and the latter being the grid-like central section of the other capacitor terminal plate 56, which plates 55, 56 enclose and complete the capacitor assembly 57. The central section 54 of plate 56 connects with the base portion by way of cylindrical section 58 fitting around the supporting spool 59 of insulating material. In fact, parts 56 and 58 may be metal-plated on spool 59 and its flange 60, with the perforated central grid 54 bonded thereto. Spool 59 is centrally bored to form a passage 61 for admission of gas under pressure to chamber 51 by way of the perforations in grid 54. A quartz window 62 is inserted in a gland element 63 threadedly engaging pressure plate 64, which in turn is adjustably mounted on flange 65 of housing 66 by means of screws 67. Teflon seals 68 and 69 are compressed by the pressure, applied through adjusting elements 63 and 64, respectively, to effectively seal the chamber 51. Current is supplied to capacitor terminal plate 56 by leads 71 and 72, the former connecting to a source, not shown. The circuit is completed to ground 73 by way of terminal plate 55 and housing 66. A second insulator 74 surrounds capacitor 57 and spool 59.

The Fig. 9 construction can be built in extremely small sizes and favorable $C/L$ ratio. Brightness values of approximately 20 million candles were observed in end-on position in argon, and relatively easily may be pushed to the maximum value $B_{max}$ of approximately 40 to 50 millions with increased $p$, $U$ and $C/L$ as discussed in the preceding paragraph. So far the design of this particular lamp was limited to $C \lesssim 0.25$ μf. and $C/L$ 25, which is comparable to the electrical data of the open air gap as described in Table 1.

Radiation time functions investigated in the gases $H_2$ and helium revealed that the decay time of the pulse differs strongly in different spectral regions. Fig. 11 and Fig. 12 show radiation time functions in helium at two different spectral ranges. The electrical data were $C=0.1$ μf., $L\sim.01$ μh., $\tau\sim.25$ μsec., $U$—2 kv., the wave lengths 4685 A. and 5875 A.

It has been found that the radiation pulse in Fig. 11 is considerably shorter than the current pulse, the latter being oscillating. This latter effect may be explained by the assumption that the spark channel has a dark core in this particular spectral range. Thus the expansion of the channel as a function of time would move the radiating shell out of the angle of view as defined by the center hole in the top electrode. This results in this sharp triangular light pulse with cut-off tail. The time base in Fig. 11 is 0.5 microsecond per division, which makes the halfwidth of the radiation approximately 0.25 ms. and the base width 0.5 ms. This in relation to the pulse length $\tau$ is much shorter than that of the open air gap in Table 1.

The rather ragged and much slower decay in Fig. 12 indicates that radiation of this particular spectral range (5875 A.) must be filling up the otherwise dark core of the channel. This radiation, of course, could also come from the bubble. A very high modulation frequency of this radiation, amounting to roughly 10 megacycles, is indicated. This phenomenon may be related to a magnetic hydrodynamic oscillation within either the interior of the channel or the "bubble" in the center hole.

What is claimed is:

1. Apparatus for generating light pulses comprising a capacitor assembly in the form of a torus, to provide a central space of cylindrical contour, said capacitor assembly including terminal plates extending across said central space, said plates having aligned apertures along the axis of said assembly, means for storing current in said capacitor assembly, and means positioned on said axis for triggering the discharge of current stored in said capacitor assembly to provide short wave radiant energy serving to reduce the jitter factor in said current discharge.

2. Apparatus for generating light pulses comprising a capacitor assembly in the form of a torus, to provide a central space of cylindrical contour, said capacitor assembly including terminal plates extending across said central space, said plates having aligned apertures along the axis of said assembly, means for storing current in said capacitor assembly, and means positioned beyond the area bounded by said terminal plates, for triggering the discharge of current stored in said capacitor assembly to provide short wave radiant energy serving to reduce the jitter factor in said current discharge.

References Cited in the file of this patent
UNITED STATES PATENTS 2,728,877    Fischer _____ Dec. 27, 1955